Patented Mar. 13, 1951

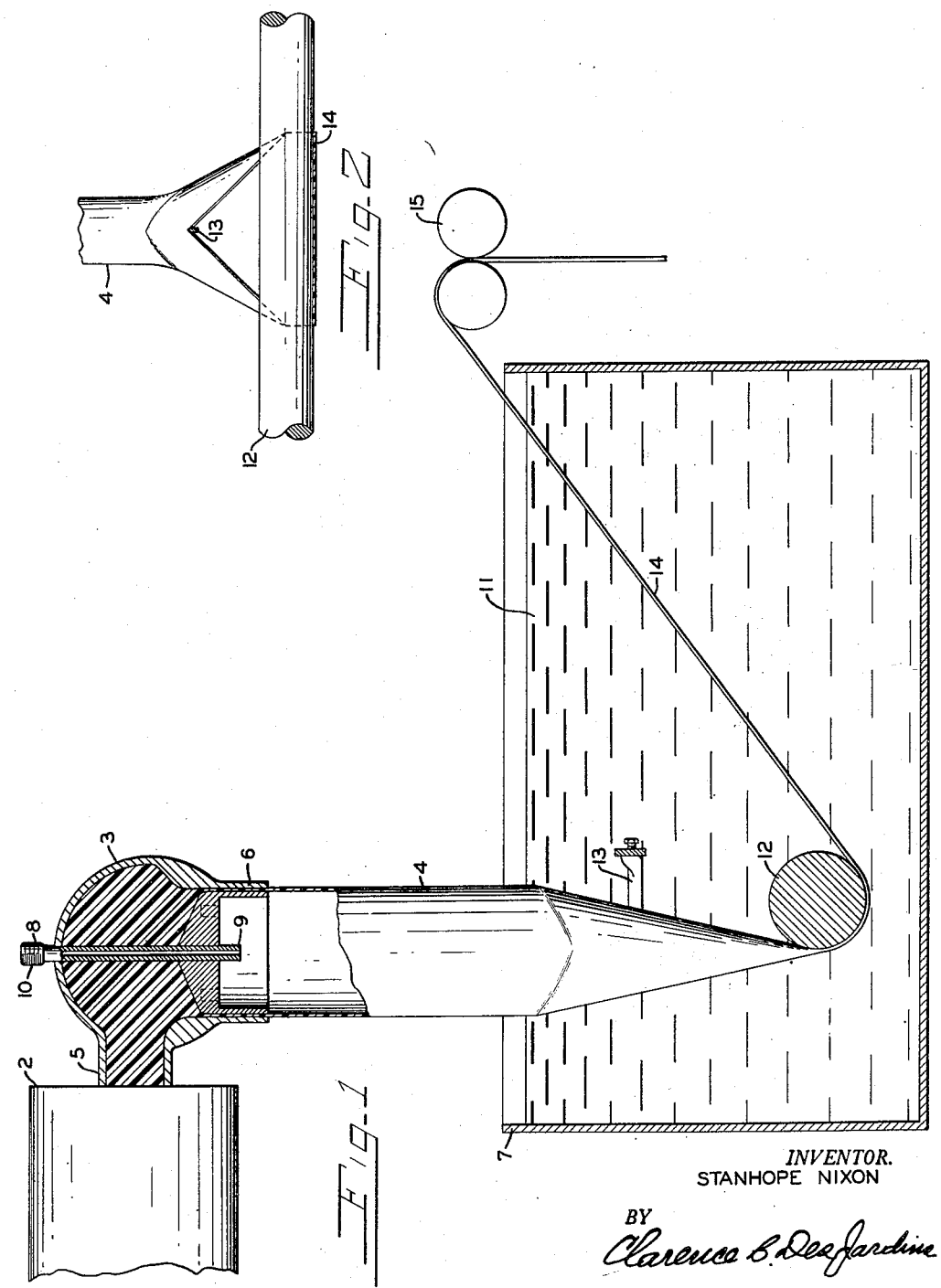

2,545,300

UNITED STATES PATENT OFFICE 2,545,300

APPARATUS FOR AND METHOD OF FABRICATING SHEETS OF PLASTIC COMPOSITIONS

Stanhope Nixon, Nixon, N. J.

Application October 20, 1949, Serial No. 122,468

17 Claims. (Cl. 18—14)

This invention relates to apparatus for and method of fabricating sheets of plastic compositions, and it particularly pertains to first extruding a tube from the plastic composition, which tube is expanded by fluid pressure to any desired size, and then splitting the tube longitudinally while it is immersed in a liquid for conversion to sheet form. With the open end of the extruded tube immersed in the liquid while being longitudinally slit, it, also, will be sealed by the liquid while being expanded to desired size and, therefore, the pressure of the fluid within the tube for expanding it can be controlled by the level of the liquid in which the tube is immersed.

While the invention is especially suitable for polymerized cellulose esters, such as polymerized cellulose acetate, nitrate, ethyl cellulose, and the like, it is also suitable for thermoplastic and/or thermosetting resinous materials, phenolic condensation materials and all such moldable compositions which are commonly extruded from plastic compositions, with or without filling material contained therein.

It has been difficult, if not impossible, heretofore, to extrude these moldable plastic compositions into flat sheets without creasing or wrinkling them, and in that process in which the composition is first formed into tubular form preliminary to being slit into a single flat layer, difficulty has been experienced by the walls of the tube sticking together, particularly since the common practice has been to pass the tube between pinch rolls to trap the means, usually air, that is employed to expand the tube before said tube is slit for being formed into a flat sheet. It is, of course, desirable to extrude the tube in a very hot condition, but naturally it is adhesive until materially cooled. Then, too, in the conversion of the extruded tube into a single flat layer wrinkles and creases develop which cannot be easily removed before the flat sheet has hardened.

The principal object of this invention is to immerse the extruded tube in a liquid and utilize the liquid for controlling the expansion of the extruded tube to determine its size.

Another object of the invention is to carry out certain steps for converting the tube into a flat sheet while it is immersed in a liquid.

Another object of the invention is in the fabrication of the sheets without creases or wrinkles being formed therein.

Another object of the invention is to form the sheets with a highly glazed surface.

Still another object of the invention is to form the sheet from an extruded tube and without any likelihood of the walls of the tube sticking together before the tube is converted into a flat sheet.

Still another object of the invention is to convert the extruded tube into a flat sheet while it is immersed in liquid so that upon emergence therefrom, the sheet will be completely formed ready to be rolled in supply rolls or subdivided in boards or panels and stacked.

Further objects, and objects relating to details of construction and economies of operation for carrying out the process, will appear from the detailed description to follow. In one instance, I have accomplished the objects of the invention by the device and means described in the following specification. My invention is clearly defined and pointed out in the appended claims. A construction constituting a preferred embodiment of my invention for carrying out the process is illustrated in the accompanying drawings forming a part of this specification, in which:

Fig. 1 is a side elevation, partly in cross section, of apparatus embodying my invention.

Fig. 2 is a detail view, looking at the slitter and guide roll, together with that portion of the tube between these elements as it is being converted into a flat sheet.

Referring specifically to the drawings, in which like numerals are used to designate like parts, numeral 2 is a portion of an extruder of any conventional type for forcing plastic compositions through a die 3 which is fitted to the discharge end of the extruder for ejecting the composition material therethrough in any desired form. An extruder commonly employed for this purpose is one having a conveyor screw operating within a chamber that is surrounded by a wall provided with passages through which a heating fluid may be circulated for maintaining the plastic composition at the critical temperature necessary for its extrusion through the extruder.

The die 3 is of a construction to form the extruded composition as a cylindrical tube 4, and it is preferably in the form of an elbow having one end 5 fitted to the end of the extruder and its opposite end 6 disposed to eject the formed tube downwardly toward a tank 7 supported thereunder. An inlet conduit 8 is provided in the die with its discharge end 9 disposed centrally of the extruded tube so that a fluid, such as air, may be forced into the tube through the conduit 8 from any source of supply. Accordingly, the inlet end of the conduit may be screw threaded at 10 to provide for attaching the end of an air supply hose thereto.

The tank is filled to the desired level with any suitable liquid 11, such as water, into which the extruded tube can be immersed as it emerges from the discharge end 6 of the die 3. One end of the tube is closed by the extruder, or the supply stock of plastic material contained therein, and its free end is closed by the liquid 11 within the tank. The tube, with its free end sealed by the liquid, is expanded to any desired diameter by the air which is forced into the interior of the tube through the conduit 8. The air pressure within the tube can be controlled by the level at which the liquid is maintained within the tank in conjunction with the air pressure in the supply source.

A guide means 12, typified by a roller, is rotatably mounted in the tank below a cutter 13 which is disposed in the tank at a substantial distance below the top thereof in the path of the tube as it is fed through the liquid to the guide roller. The cutter slits the tube longitudinally, and the slit tube is threaded over the roller to be spread out into a flat sheet 14. While the tube is shown to be slit longitudinally through only one wall and to form one sheet only, it will, of course, be understood that the tube could be cut longitudinally at two or more places to form two or more sheets of any desired width.

The flat sheet as it emerges from the tank may be fed through a pair of nip rollers 15 and then be subdivided transversely into desired lengths or rolled upon supply reels.

By forming the sheet as described above, the extruded tube can be kept inflated with air which is trapped and retained in the tube until after the tube is slit. With the cutter for slitting the tube, disposed beneath the liquid level, the air pressure within the tube can be readily controlled by a variation of the level of the liquid in the tank. With a combined control of the air pressure within the tube by pressure in the air supply and the level of the liquid in the tank, the size to which the extruded tube is expanded can be accurately regulated. The tube can be extruded with the plastic composition at a higher temperature than that to which it would be normally heated as the tube can be well cooled before being slit. Subjection of the tube to the liquid while being very hot gives its surfaces a superior glaze and polish, and there is no possibility of sticking or creasing inasmuch as the walls of the tube are not brought into contact for confining the air during expansion of the tube. After the tube is formed, all steps in converting the tube to a flat sheet are carried out under liquid so that when the flat sheet emerges therefrom, it is completely formed, ready to be handled without further treatment except for subdividing it into shorter lengths.

While I have shown one preferred embodiment of my invention, it will be understood that there may be various changes in details of construction without departing from the spirit of my invention and, therefore, I claim my invention broadly, as indicated by the appended claims.

Having thus described my invention, what I claim as new and useful and desire to secure by United States Letters Patent, is:

1. In apparatus for fabricating molded products from a plastic composition, the combination of an extrusion device provided with a die through which the composition is ejected in tubular form, a tank, a liquid contained within the tank for immersion of the extruded tube, means for expanding the tube to increase its diameter, and means positioned beneath the level of the liquid in the tank for slitting the tube longitudinally to form sheets.

2. In apparatus for fabricating molded products from a plastic composition, the combination of an extrusion device provided with a die through which the composition is ejected in tubular form, a tank, a liquid contained within the tank for immersion of the extruded tube, a nozzle projected to the interior of the extruded tube for expanding the tube, and means positioned beneath the level of the liquid in the tank for slitting the tube longitudinally for forming sheets.

3. In apparatus for fabricating molded sheets of plastic compositions, the combination as set forth in claim 2 including means within the tank, below the liquid level, over which the sheet is threaded for feeding the extruded tube through the tank.

4. In apparatus for fabricating molded sheets from a plastic composition, the combination as set forth in claim 3 in which the means within the tank over which the sheet is threaded for feeding the tube is a roll.

5. In apparatus for fabricating molded sheets from a plastic composition, the combination of an extrusion device provided with a die through which the composition is ejected in tubular form, a tank, a liquid contained within the tank for immersion of the extruded tube, a guide means in the tank below the level of the liquid for feeding the tube through the tank, a nozzle projected to the interior of the extruded tube for ejecting fluid therein for expanding said tube as it is being formed, and means disposed between the guide means and the level of the liquid in the tank for slitting the tube longitudinally into sheets.

6. In apparatus for fabricating molded products from a plastic composition, the combination as set forth in claim 5 in which the slitting means is disposed to slit longitudinally one wall of the tube.

7. In apparatus for fabricating molded products from plastic composition, the combination as set forth in claim 6 in which the guide means is a roller.

8. A method for fabricating sheets from moldable plastic compositions comprising extruding a plastic material in the form of a hollow tube, keeping the walls of the tube out of contact, immersing the extruded tube into a liquid, slitting the tube longitudinally beneath the level of the liquid, and threading the longitudinally split tube over a guide means in sheet form.

9. A method for fabricating sheets from molded plastic compositions as set forth in claim 8 including the step of expanding the tube before it is longitudinally split.

10. A method for fabricating sheets from molded plastic compositions as set forth in claim 9 in which the tube is expanded by being inflated with a fluid and the pressure of the fluid in the tube is controlled by the level of the liquid in which the tube is immersed.

11. A method for fabricating sheets from moldable plastic compositions comprising extruding the plastic material into a tube, immersing the extruded tube into a liquid, slitting the tube longitudinally through one wall thereof beneath the level of the liquid and threading the longitudinally slit tube over a guide means into a sheet.

12. A method for fabricating sheets from molded plastic compositions as set forth in claim 11 including the step of expanding the tube before it is longitudinally split.

13. A method for fabricating sheets from moldable plastic compositions as set forth in claim 12 in which the tube is expanded by being inflated with a fluid and the pressure of the fluid in the tube is controlled by the level of the liquid in which the tube is immersed.

14. A method for fabricating sheets from moldable plastic compositions comprising extruding the plastic material into a tube having a free open end and its opposite end closed by the plastic material from which the tube is being extruded, immersing the extruded tube into a liquid for closing its open end, inflating the tube between the end which is closed by the plastic material and the opposite end in said liquid, slitting the tube longitudinally beneath the level of the liquid in which the tube is immersed, and threading the split tube over a guide means into a sheet.

15. A method for fabricating sheets from moldable plastic compositions as set forth in claim 14 in which the split tube is threaded over the guide means beneath the level of the liquid in which the tube is immersed.

16. In apparatus for fabricating molded products from a plastic composition, the combination of an extrusion device provided with a die through which the composition is ejected into tubular form, a tank, a liquid contained within the tank for immersion of the extruded tube, means for holding the tube walls apart, means positioned beneath the level of the liquid in the tank for slitting the tube longitudinally to form a flat sheet, and means over which the sheet from the slit tube is threaded in withdrawing said sheet from the tank.

17. In apparatus for fabricating molded products from a plastic composition, the combination of an extrusion device provided with a die through which the composition is ejected into tubular form, a tank, a liquid contained within the tank for immersion of the extruded tube, means positioned beneath the level of the liquid in the tank for slitting the tube longitudinally to form a flat sheet, and means over which the sheet from the slit tube is threaded in withdrawing said sheet from the tank.

STANHOPE NIXON.

REFERENCES CITED

The following references are of record in the file of this patent:

UNITED STATES PATENTS

| Number | Name | Date |
|---|---|---|
| 2,177,658 | Kimble et al. | Oct. 31, 1939 |
| 2,358,376 | Banigan et al. | Sept. 19, 1944 |
| 2,423,260 | Slaughter | July 1, 1947 |
| 2,433,937 | Tornberg | Jan. 6, 1948 |